United States Patent

Wiesner et al.

[11] 4,162,902
[45] Jul. 31, 1979

[54] REMOVING PHENOLS FROM WASTE WATER

[75] Inventors: Paul Wiesner, Oberursel; Hans-Martin Stonner, Schwalbach, both of Fed. Rep. of Germany

[73] Assignee: Metallgesellschaft Aktiengesellschaft, Frankfurt am Main, Fed. Rep. of Germany

[21] Appl. No.: 838,429

[22] Filed: Sep. 30, 1977

Related U.S. Application Data

[63] Continuation of Ser. No. 693,040, Jun. 4, 1976, abandoned.

[30] Foreign Application Priority Data

Jun. 24, 1975 [DE] Fed. Rep. of Germany ....... 2527983

[51] Int. Cl.² .................. B01D 19/00; B01D 53/14
[52] U.S. Cl. ............................... 55/54; 55/70; 55/73; 208/263; 210/21; 568/759
[58] Field of Search ............... 55/70, 73, 54; 208/263; 210/21; 260/627 R, 627 B, 627 H

[56] References Cited

U.S. PATENT DOCUMENTS

| | | | |
|---|---|---|---|
| 1,856,690 | 5/1932 | Carswell | 260/627 R |
| 2,675,412 | 4/1954 | Herbert et al. | 260/627 R |
| 2,927,075 | 3/1960 | Brown | 210/21 X |
| 3,335,071 | 8/1967 | Bollen et al. | 55/70 X |
| 3,915,674 | 10/1975 | Smith | 210/21 X |
| 3,972,693 | 8/1976 | Wiesner et al. | 55/70 X |

Primary Examiner—Robert H. Spitzer
Attorney, Agent, or Firm—Sprung, Felfe, Horn, Lynch & Kramer

[57] ABSTRACT

A process for removing phenols from waste water resulting from the gasification or carbonization of coal and containing $CO_2$, $H_2S$ and $NH_3$, comprising mixing the waste water with a low-boiling organic solvent, separating the mixture into a solvent layer and an aqueous layer, stripping off from the aqueous layer under superatmospheric pressure the vapors of $CO_2$, $H_2S$ and organic solvent contained therein, then stripping off from the aqueous layer the $NH_3$ contained therein leaving a refined aqueous product layer suitable for discharge, scrubbing the stripped vapors under superatmospheric pressure with a portion of the cold refined product to remove organic solvent contained therein, condensing part of the solvent and separating it under superatmospheric pressure, and scrubbing the remaining acid gases still containing ammonia and solvent with recirculated cooled raw phenol to remove the ammonia and solvent.

1 Claim, 1 Drawing Figure

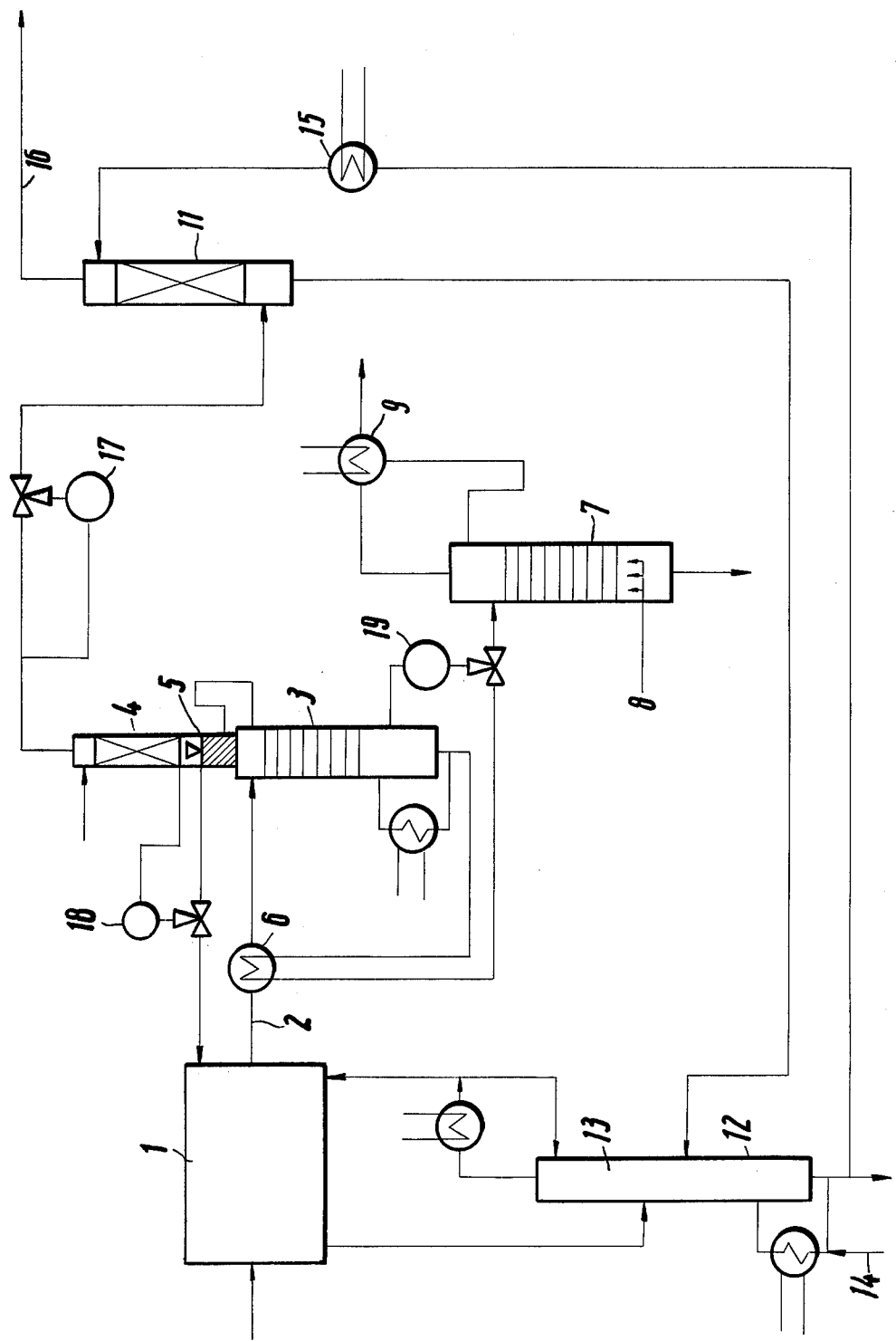

REMOVING PHENOLS FROM WASTE WATER

This is a continuation of application Ser. No. 693,040, filed June 4, 1976, now abandoned.

BACKGROUND

This invention relates to a process for removing phenols from waste water from the gasification or carbonisation of coal, comprising extracting the waste water with a low-boiling organic solvent, recovering the solvent, removing the acid constituents under superatmospheric pressure, and stripping off the ammonia.

The waste water occurring during pressure gasification or carbonisation of coal contains phenols, fatty acids, neutral oils as well as dissolved gases, such as ammonia, carbon dioxide, hydrogen sulfide, and hydrogen cyanide.

Numerous processes are known in which phenols are removed from such waste water by an extraction with low-boiling solvents.

For instance, it is known to remove phenols from ammonia-containing waste water from coke oven plants, carbonisation plants, gas producing plants and the like by a process in which the waste water is intimately mixed with an oxygen-containing low-boiling organic solvent, such as butyl acetate. In the subsequent stratification, a major part of the phenols enters the solvent. When the process is repeated several times in a counterflow operation, the phenols can be recovered in a yield above 99.8%. The organic solvent required to extract the phenols may be purified by distillation for subsequent re-use.

The dephenolised water may be treated to remove ammonia, if desired, and may then be subjected to a biological afterpurification (Lurgi-Manual, 1960, pages 64/65).

It is also known to use two solvent cycles for dephenolising industrial waste water. A major part of the phenols is removed in the first cycle and the remainder in the second. The solvent of the first cycle is removed from the laden solvent of the second cycle, and the solvent recovered by distillation from the first cycle is fed to the second cycle (German Pat. Specification No. 939,268). This process is applicable only to two gas liquor streams which differ in phenol distribution and rate.

After each dephenolising process, it is necessary to remove the residual substances still contained in the waste water, particularly hydrogen sulfide, carbon dioxide, and ammonia, and the organic solvent used for extraction. Various processes have been proposed for the removal of hydrogen sulfide, carbon dioxide, and ammonia.

U.S. Pat. No. 2,018,863 describes a process for recovering ammonia from gases produced by the distillation of coal. In that process, the gases are first cooled to 35° C. to form a condensate which contains ammonia and smaller quantities of $CO_2$ and $H_2S$. This condensate is fractionated and the gases are scrubbed to remove impurities, particularly $CO_2$ and $H_2S$. The scrubbed gas consists mainly of ammonia. In that process, the scrubbed gas must be scrubbed with sulfuric acid to remove the residual water vapor. Because the cooling is so controlled that the resulting ratio of ammonia to dissolved $CO_2$ and $H_2S$ is at least 2:1, the process can be used to process only gases in which ammonia predominates.

Gases produced by distillation of coal can also be scrubbed with a slightly ammoniacal aqueous solution, the spent scrubbing solution being distilled at low temperature and under a low pressure to remove $H_2S$ and HCN and smaller quantities of $CO_2$. The remaining spent scrubbing solution containing ammonium carbonate is distilled to remove $H_2S$, HCN and ammonia. These removed substances are condensed and the condensate is fractionated to remove ammonia. The residual solution is recycled to the scrubber (U.S. Pat. No. 2,162,838).

If the ammonia is not to be recovered but to be burnt, hydrogen sulfide must be separately removed, for ecological reasons. Besides, the ammonia must be present in the highest concentration possible, i.e., the quantity of accompanying steam must be minimized so that its calorific value is utilized as fully as possible.

A high $CO_2$ content of these waste waters is not desirable because carbonate and carbamate tend to precipitate in cold conduit portions from gases which contain ammonia and $CO_2$ and small amounts of accompanying steam. Such precipitates will greatly disturb or may even prevent the operation. It is obvious to accomplish these objects as follows:

(a) The solvent is stripped off with circulated gas; the solvent-laden circulated gas is then scrubbed with cooled raw phenol; solvent is jointly stripped by means of stripping steam from the circulated phenol and from the raw phenol.

(b) This is followed by a pressure de-acidification to remove about 50–70% of the $CO_2$ and about 98–99% of the $H_2S$. The mixed $CO_2$ and $H_2S$ gases are scrubbed with cold water to remove $NH_3$.

(c) Ammonia is stripped off together with the residual $CO_2$ and $H_2S$.

It is also known that a higher boiling solvent, such as n-butyl acetate, may be used and may be recovered from the refined product in that the solvent vapors which have been stripped off under atmospheric pressure and which become available in a mixture with $NH_3$, $CO_2$, $H_2S$ and $H_2O$, are scrubbed twice, one each (a) with 50% of the cold refined product and
(b) with 100% of the incoming waste water, which has been cooled and still contains phenols ("Ol und Kohle" 38 (1942), 525; "Erdol und Kohle" 4 (1951), 177–180).

This procedure involves a circulation of $NH_3$, $CO_2$ and $H_2S$ gases at a high rate through the entire plant, and the escaping acid gas still contains relatively large quantities of $NH_3$ and solvent so that the solvent losses are high. Besides, n-butyl acetate suffers large losses by saponification, and $NH_3$ has a disturbing influence during the further processing of the mixed $CO_2$ and $H_2S$ gases or their destruction.

It is accordingly an object of the invention to avoid these and other disadvantages of the known processes and to provide a process which is simple and has a high efficiency.

This object is accomplished according to the invention in that the solvent dissolved in the refined product is stripped off under superatmospheric pressure jointly with the carbon dioxide and hydrogen sulfide, the resulting vapors are scrubbed under superatmospheric pressure with a small part of the cold refined product, part of the solvent is recovered by being condensed and by being separated under superatmospheric pressure, and the remaining acid gases, which still contain ammonia and solvent, are scrubbed with circulating, cooled raw phenol in order to remove residual ammonia and residual solvent.

The invention is illustrated in the drawing which is a schematic flow sheet of a process in accordance with the invention.

Waste water from the pressure gasification of coal is extracted in known manner in a mixer settler or extraction tower 1 with counterflowing solvent, e.g., isopropyl ether. The resulting refined product, which contains solvent, is fed through 2 to a pressure de-acidification column 3. In the pressure de-acidification column 3, $CO_2$ and $H_2S$ and a small quantity of $NH_3$ as well as the dissolved solvent are stripped off.

The resulting mixed gases enter the scrubbing section 4 and are scrubbed therein with cold water. In the process according to the invention, part of the cold refined product, e.g., 5–20%, may be used for scrubbing.

A major part of the $NH_3$ is retained by the scrubbing liquor, which also condenses part of the solvent. In the lower portion of the scrubbing section of the pressure de-acidification column, the water-solvent mixture is fed into a separator 5. The separated part of the solvent is conducted into a pressure vessel (not shown) and is withdrawn from the latter under control by a level controller 18. The spent scrubbing liquor flows into the stripping section of the pressure de-acidifier. In this stripping section, the dissolved solvent is stripped from the liquor. As this stripped off solvent is only a fraction of all solvent contained in the refined product, the major part can be removed in the separator.

The partly de-acidified liquor flows through a heat exchanger 6 and is subsequently flashed as it enters the $NH_3$ column 7, which is fed with steam 8 or indirectly heated so that $NH_3$ is stripped off together with the residual $CO_2$ and the residual $H_2S$ and is partly condensed in 9 in known manner and is fed as highly concentrated gas to a furnace. A level controller 19 is provided between the deacidification column 3 and the $NH_3$ column 7. The gas leaving the scrubbing section 4 is flashed as it flows through a pressure-controller 17. This gas contains $CO_2$ and $H_2S$ as well as solvent, $NH_3$ and traces of water. An even higher $NH_3$ content will be obtained if $NH_3$-containing, cold refined product rather than water is used as the scrubbing liquor.

The resulting gas is now scrubbed in the scrubbing tower 11 with circulated raw phenol, which has been cooled in 15.

It has been found that not only solvent but also $NH_3$ is removed by the scrubbing with phenol so that the acid gas ($CO_2 + H_2S$) leaving the plant at 16 is free from solvent and $NH_3$.

In a stripping column 12, the scrubbing phenol laden with solvent and $NH_3$ and the solvent-containing raw phenol from the distilling section 13 are jointly treated with stripping steam fed at 14.

As a result, solvent and $NH_3$ are stripped from the phenol. The solvent is recovered by condensation, and the $NH_3$ is recovered as a gas through the vent system and a scrubbing tower incorporated in the inert gas system or vent system of the plant.

It will be appreciated that the instant specification and examples are set forth by way of illustration and not limitation, and that various modifications and changes may be made without departing from the spirit and scope of the present invention.

What is claimed is:

1. A process for removing phenols as well as the volatile compounds $NH_3$, $CO_2$ and $H_2S$ from waste water resulting from gasification or degasification of coal by means of liquid/liquid countercurrent extraction of the phenols with isopropylether thereby achieving a phenol laden solvent layer and a dephenolized aqueous layer, by an organic solvent, followed by two consecutive distillation steps for separate recovery of acid gases $CO_2$ and $H_2S$, solvent and ammonia with a low acid gas content, comprising:

(a) Extracting the waste water in countercurrent with a low-boiling organic solvent, thereby achieving a phenol laden solvent layer and a dephenolized aqueous layer, and separating the layers;

(b) stripping off from the aqueous layer under superatmospheric pressure as vapors $CO_2$, $H_2S$, small amounts of $NH_3$ and the organic solvent contained therein;

(c) condensing the vapors of step (b) by washing them under pressure with from 5 to 20% by weight of the cold dephenolized aqueous layer from step (a) thereby to remove the $NH_3$ as well as most of the organic solvent, thus achieving an aqueous/organic mixture with an organic solvent content exceeding the physical solubility of the organic solvent in water, settling the excess solvent by gravity as an organic layer which is drawn off from the aqueous layer which is returned to step (b);

(d) scrubbing the acidic vapors from step (c) with cold circulating phenol from step (f) to recover the last traces of solvent and $NH_3$ to receive a $CO_2$ and $H_2S$ acid gas freed of solvent and $NH_3$;

(e) stripping the bottom product of step (b) with live steam under atmospheric pressure, thereby achieving as overhead vapors a concentrated $NH_3$-vapor with only small amounts of $CO_2$ and $H_2S$, which can be either burned or condensed, and as a bottom product a treated waste water suitable for biological treatment;

(f) distilling the solvent layer from step (a) in a distillation column thereby achieving as overhead product a pure solvent which is condensed and recycled to step (a) and as bottom product a phenol which is partly used for scrubbing of the acidic vapors in step (d) and partly discharged as crude phenol.

* * * * *